(12) United States Patent
Kodama et al.

(10) Patent No.: US 6,624,962 B1
(45) Date of Patent: *Sep. 23, 2003

(54) STORAGE DEVICE AND METHOD IN WHICH WRITE/READ FAULT ERRORS ARE NOT GENERATED WHEN MODE IS SWITCHED FROM POWER SAVE MODE OR MIGRATION MODE TO ORDINARY MODE

(75) Inventors: Tohru Kodama, Kanagawa (JP); Yukio Urata, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,569

(22) Filed: Dec. 9, 1999

(30) Foreign Application Priority Data

Apr. 12, 1999 (JP) ............................................. 11-104437

(51) Int. Cl.⁷ ............................................. G11B 21/02
(52) U.S. Cl. ......................................................... 360/75
(58) Field of Search ............................. 360/69, 71, 75, 360/7, 47, 31, 25

(56) References Cited

U.S. PATENT DOCUMENTS

| 5,345,347 A | * | 9/1994 | Hopkins et al. | ............... 360/71 |
| 5,579,186 A | * | 11/1996 | Yamamoto et al. | ........... 360/75 |
| 5,682,273 A | * | 10/1997 | Hetzler | ......................... 360/75 |
| 6,163,422 A | * | 12/2000 | Blumenau | .................... 360/47 |

FOREIGN PATENT DOCUMENTS

| JP | 7295672 | 11/1995 |
| JP | 8335357 | 12/1996 |
| JP | 9237463 | 9/1997 |
| JP | 9297957 | 11/1997 |

\* cited by examiner

Primary Examiner—David Hudspeth
Assistant Examiner—Mitchell Slavitt
(74) Attorney, Agent, or Firm—Greer, Burns & Crain, Ltd.

(57) ABSTRACT

A storage device capable of avoiding write fault error or read error occurring immediately after switching from power save mode or migration mode to ordinary mode. By carrying out a dummy write/dummy read command when switching from power save mode for reducing electric power consumption or migration mode for reducing the time for which the electric current flows in magnetic heads, normal write command/read command is executed in a condition in which the magnetic heads are placed completely in on-track condition.

14 Claims, 9 Drawing Sheets

STORAGE DEVICE AND METHOD IN WHICH WRITE/READ FAULT ERRORS ARE NOT GENERATED WHEN MODE IS SWITCHED FROM POWER SAVE MODE OR MIGRATION MODE TO ORDINARY MODE

FIELD OF THE INVENTION

The invention relates to a storage device for use as an external storage device of a computer or the like and a method for controlling the storage device. More particularly, this invention relates to a storage device capable of avoiding a write fault error or read error which may be caused in switching from power save mode or migration mode to ordinary mode for read/write.

BACKGROUND OF THE INVENTION

As an external storage device of a computer or the like, a storage device employing a circular magnetic disk as a recording medium is used. In such a storage device, reduction of power consumption is achieved by switching to power save mode in which supply of power to a read/write circuit is stopped or the operating speed is reduced and the like when a command (instruction) is received from a host. Further, in the storage device, if time in which no read/write command is received reaches a predetermined time a migration mode is activated. In this migration mode reading of the servo pattern on the magnetic disk is carried out one by one so as to reduce a time for which a sense current flows, thereby prolonging the life of the magnetic head.

However, when changing from the above power save mode or migration mode back to the ordinary mode there is a tendency that the on-track condition of the magnetic head becomes unstable. It has been known by experience that a write fault error or read error is likely to occur when the on-track condition of the magnetic head becomes unstable. Countermeasure for this phenomenon has been seriously demanded.

FIG. 9 is a block diagram which shows an electrical structure of a conventional storage device 20. The storage device 20 comprises a head disk assembly (HDA) 110, a printed circuit board 120 and a connector 140. The hard disk assembly 110 is configured with sealing magnetic disks magnetic disks $111_1$–$111_n$, magnetic heads $113_1$–$113_m$ and the like in a container formed of base and cover. The printed circuit board 120 incorporates various circuits such as (HDC) circuit 121 and micro processing device (MPU) 124. The connector 140 electrically connects components in the HDA 110 to the printed circuit board 120.

The storage device 20 is connected to the CPU 150 provided in a not illustrated host system. This storage device 20 reads/writes to the magnetic disks $111_1$–$111_n$ according to a read/write command from the CPU 150. The command from the CPU 150 also includes power save mode switching command for switching from the ordinary mode to the previously described power save mode.

n sheets of circular recording mediums as the magnetic disks $111_1$–$111_n$ are provided in the HDA 110 for magnetically storing the data. These magnetic disks $111_1$–$111_n$ are provided in such a way that they overlay each other with a constant gap between in an axial direction. A spindle motor (SPM) 112 rotates the aforementioned magnetic disks $111_1$–$111_n$ at high speed. Each of the magnetic heads $113_1$–$113_m$ comprises a head core having a very small gap and a coil wound around the head core. These magnetic heads $113_1$–$113_m$ are arranged respectively near the magnetic disks $111_1$–$111_n$.

The magnetic heads $113_1$–$113_m$ write data into the magnetic disks $111_1$–$111_n$ using the magnetic field generated by a recording current supplied to their coil at the time of writing, whereas they magnetically detect data which is recorded in the magnetic disks $111_1$–$111_n$ as a reproduced current. The number m of these magnetic heads $113_1$–$113_m$ is appropriately selected depending on the number n of the magnetic disks $111_1$–$111_n$.

A carriage 114 is provided in the vicinity of the magnetic disks $111_1$–$111_n$ so as to support the magnetic heads $113_1$–$113_m$. A voice coil motor (VCM) 115 rotates the carriage 114 to move the magnetic heads $113_1$–$113_m$. A flexible print circuit sheet (FPC) 116 is a sheet-like flexible wiring material for connecting between the carriage 114 and each not illustrated terminal of a connector 140.

A head integrated circuit (IC) 117 is composed of a write amplifier and a not illustrated preamplifier and arranged in parallel on the surface of the FPC 116. The write amplifier changes over the polarity of the recording current to be supplied to the magnetic heads $113_1$–$113_m$ depending on write data supplied from the CPU 150 and the preamplifier amplifies reproduction voltage (read signal) detected by the magnetic heads $113_1$–$113_m$.

A printed circuit board 120 is an externally mounted board attachable to/detachable from a rear face of the HDA 110 via a connector 140. The connector 140 ensures an interface between components of the HDA 110 and various circuits mounted on the printed circuit board 120. In the printed circuit board 120, the HDC circuit 121 is connected to the CPU 150 through an interface such as not illustrated small computer system interface (SCSI) bus or the like so as to send/receive various commands (read command, write command and the like), write data to be written into the magnetic disks $111_1$–$111_n$ read data read out from the magnetic disks $111_1$–$111_n$ and the like. The HDC circuit 121 generates a control signal or the like for controlling a format for recording/reproduction in the magnetic disks $111_1$–$111_n$ or the like.

A flash read only memory (FROM) 122 stores programs for read/write control and power supply control to be carried out by the HDC circuit 121 and MPU 124, and it is accessed by the HDC 121 and the MPU 124, when the programs are to be executed. The random access memory (RAM) 123 temporarily stores write data input from the CPU 150, read data read out from the magnetic disks $111_1$–$111_n$ and various data generated during execution of the above program.

A read channel 125 comprises a modulation circuit for writing write data to the magnetic disks $111_1$–$111_n$, a parallel/serial conversion circuit for converting parallel write data to serial data, a demodulation circuit for reading read data from the magnetic disks $111_1$–$111_n$ and the like. Further, the read channel 125 comprises a serial/parallel conversion circuit for converting serial read data to parallel data, a synthesizer circuit for generating a timing signal for respective parts of the device by multiplying the frequency of an oscillation circuit using a crystal oscillator and the like.

The MPU 124 controls respective parts of the device and its main control includes read/write control, power save mode control, migration mode control and the like. A detail of an operation of this MPU 124 will be described later. A servo demodulation circuit 126 demodulates servo pattern for positioning stored in the magnetic disks $111_1$–$111_n$ by peak hold, integration or the like. A voile coil motor (VCM) driving circuit 127 drives the VCM 115 and is provided with a not illustrated power amplifier for supplying a driving current to the VCM 115 through a connector 140. A spindle motor (SPM) driving circuit 128 drives the SPM 112 and is provided with a not illustrated power amplifier (for supplying a driving current via the connector 140.

The MPU 124 recognizes a servo pattern demodulated by the servo demodulation circuit 126 and controls the position of the magnetic head $113_1$–$113_m$ by controlling each of driving currents in the VCM driving circuit 127 and SPM driving circuit 128. Further, the MPU 124 controls the HDC circuit 121, read channel 125, head IC 117 and the like. A power source 129 supplies electric power to the respective parts of the device. The MPU 124 controls an electric power supply from the power source 129.

Next, an operation of the conventional storage device 20 will be described. Hereinafter, mainly read/write operation immediately after transfer from the power save mode to ordinary mode and read/write operation immediately after transfer from migration mode to ordinary mode will be described. When electric power is supplied to the respective parts of the device from the power source 129 by control of the MPU 124, the SPM 112 is driven by the SPM driving circuit 128 under a control of the MPU 124, and the magnetic disks $111_1$–$111_m$ are driven. The servo pattern recorded on the magnetic disks $111_1$–$111_m$ is read by the magnetic heads $113_1$–$113_m$. The information of the servo pattern is demodulated by the servo demodulation circuit 126 via the head IC 117 and read channel 125 and input to the MPU 124.

Thus, the MPU 124 recognizes positions of the magnetic heads $113_1$–$113_m$ on the magnetic disks $111_1$–$111_n$ from information of the servo pattern. When a read/write command is input to the MPU 124 from the CPU 150 via the HDC circuit 121, the MPU 124 controls the VCM driving circuit 127 according to the information of the servo pattern from the servo demodulation circuit 126. Consequently, the VCM 115 is driven so as to carry out seek operation in which the magnetic heads $113_1$–$113_m$ are moved up to a predetermined position. When they are moved up to the predetermined position, read/write operation to the magnetic disks $111_1$–$111_n$ by the magnetic heads $113_1$–$113_m$ is carried out, and read/write data is output from the head IC 117 to the MPU 124. After that, the read/write operation is carried out according to a read/write command input from the CPU 150.

When the power save mode transfer command is input to the MPU 124 from the CPU 150 via the HDC circuit 121, the MPU 124 controls for transfer from ordinary mode to power save mode. More specifically, the MPU 124 stops electric power supply to the head IC 117 and read channel 125 (sleep state). Consequently, power consumption of the entire storage device 10 is saved.

Because the head IC 117 is in the stopped condition in this power save mode, no current flows to the magnetic heads $113_1$–$113_m$. In this case, read operation for the servo pattern on the magnetic disks $111_1$–$111_n$ is not carried out. Therefore, the MPU 124 cannot recognize the servo pattern information. Thus, since the magnetic heads $113_1$–$113_m$ are not in the on-track condition in the power save mode, the read/write operation cannot be performed.

When in power save mode, a read/write command is input to the MPU 124 from the CPU 150 via the HDC circuit 121, the MPU 124 controls to supply normal electric power to the head IC 117 and read channel 125 so as to transfer from the power save mode to ordinary mode. The MPU 124 makes the magnetic heads $113_1$–$113_m$ track the magnetic disks $111_1$–$111_n$ according to the information of the servo pattern supplied by the servo demodulation circuit 126, and after that, the read/write operation is carried out.

When following read/write command is not input, for example, within than 15 seconds after a read/write command is input to the MPU 124, the MPU 124 switches from the ordinary mode to the migration mode. More specifically, by controlling the read channel 125 and head IC 117, the MPU 124 controls the magnetic heads $113_1$–$113_m$ in the on-track condition to read, for example, one (or two or more) servo patterns at a time. Consequently, time taken for current to flow to the magnetic heads $113_1$–$113_m$ can be shortened as compared to a case in which all servo patterns are read, and the life of the head can be extended.

In this migration mode, the servo pattern information (information of one or two servo patterns read at a time), which is read by the magnetic heads $113_1$–$113_m$, is demodulated by the servo demodulation circuit 126 and input to the MPU 124. In this case, the MPU 124 recognizes the positions of the magnetic heads $113_1$–$113_m$. However, because the quantity of the servo pattern information is smaller as compared to ordinary mode, the above recognition of the MPU 124 is not complete. Therefore, although the magnetic heads $113_1$–$113_m$ are barely in the on-track condition, the positions of the magnetic heads $113_1$–$113_m$ are in unstable condition. This is due to the fact that the position control based on a small quantity of the servo patter information is unstable.

In the migration mode, when a read/write command is input to the MPU 124 from the CPU 150 via the HDC circuit 121, the MPU 124 controls the magnetic heads $113_1$–$113_m$ to read all the servo patterns so as to switch from the migration mode to the ordinary mode. The MPU 124 then executes the read/write operation according to the read/write command.

It has been described above that in the power save mode of the conventional storage device the magnetic heads $113_1$–$113_m$ are not in the on-track condition relative to the magnetic disks $111_1$–$111_n$ and the MPU 124 is not capable of obtaining the servo pattern information. It has been also described above that in the power save mode of the conventional storage device, when a read/write command is input in the power save mode, the read/write operation is carried out after switching from the power save mode to the ordinary mode.

However, in reality, tracking on an accurate position often fails immediately after a change from the power save mode to the ordinary mode, even when a control for placing the magnetic heads $113_1$–$113_m$ in the on-track condition is carried out in a condition that no servo pattern information exists. Therefore, there is a problem that a write fault error or a read error frequently occurs when the read/write operation is carried out with the magnetic heads not completely in the on-track condition.

It has also been described above that because the quantity of the servo pattern information is small on the MPU 124, the magnetic heads $113_1$–$113_m$ are barely in the on-track condition in the migration mode of the conventional storage device and hence their positions are very unstable. It has also been described above that, in the migration mode of the conventional storage device when a read/write command is input in the migration mode, the read/write operation is carried out after changing from the migration mode to the ordinary mode.

However, in reality, there is a problem that the write fault error or the read error frequently occurs like the above-described case of the power save mode when the read/write operation is carried out by the magnetic heads $113_1$–$113_m$ in the unstable on-track condition immediately after changing from the migration mode to the ordinary mode.

SUMMARY OF THE INVENTION

In light of problems described above, it is an object of the invention to provide a storage device capable of avoiding occurrence of write fault error or read error immediately after changing from the power save mode or the migration mode to the ordinary mode. It is also an object of this invention to provide a method for controlling the storage device.

According to one aspect of this invention, a head reads or writes data from or on a recording medium, and a read/write control unit performs read/write for two times when a command for reading data from or writing data on the recording medium is received from a host while in a power save mode.

According to another aspect of this invention, a head reads or writes data from or on a recording medium, a seek unit seeks the head to a predetermined position on the recording medium when a command for reading data from or writing data on the recording medium is received from a host while in a power save mode, and a read/write control unit performs read/write by controlling the head based on the received read/write command after the seek operation by the seek unit is over.

According to still another aspect of this invention, a read/write step is provided in which read/write is performed two times when a command for reading data from or writing data on a recording medium is received from a host while in a power save mode, by controlling a head, which actually performs the read/write, based on the received read/write command.

Other objects and features of this invention will become apparent from the following description with reference to the accompanying drawings.

DESCRIPTION OF THE PREFERRED EMBODIMENTS

Hereinafter, the embodiment of the storage device according to the present invention will be described in detail with reference to the accompanying drawing.

Figure 1:
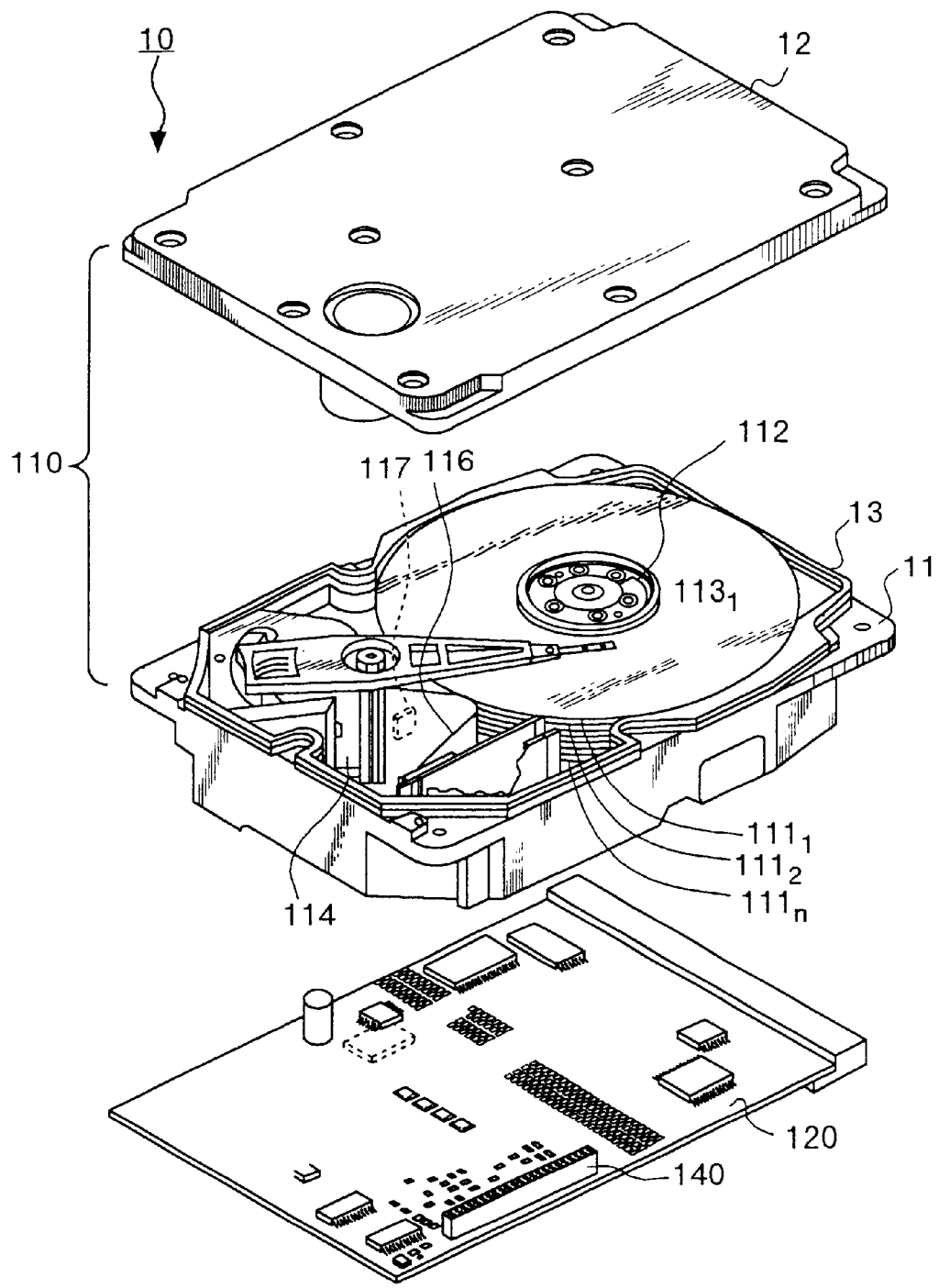
FIG. 1 is a exploded perspective view showing the outer configuration of a storage device 10 according to a preferred embodiment of the invention.
Figure 2:
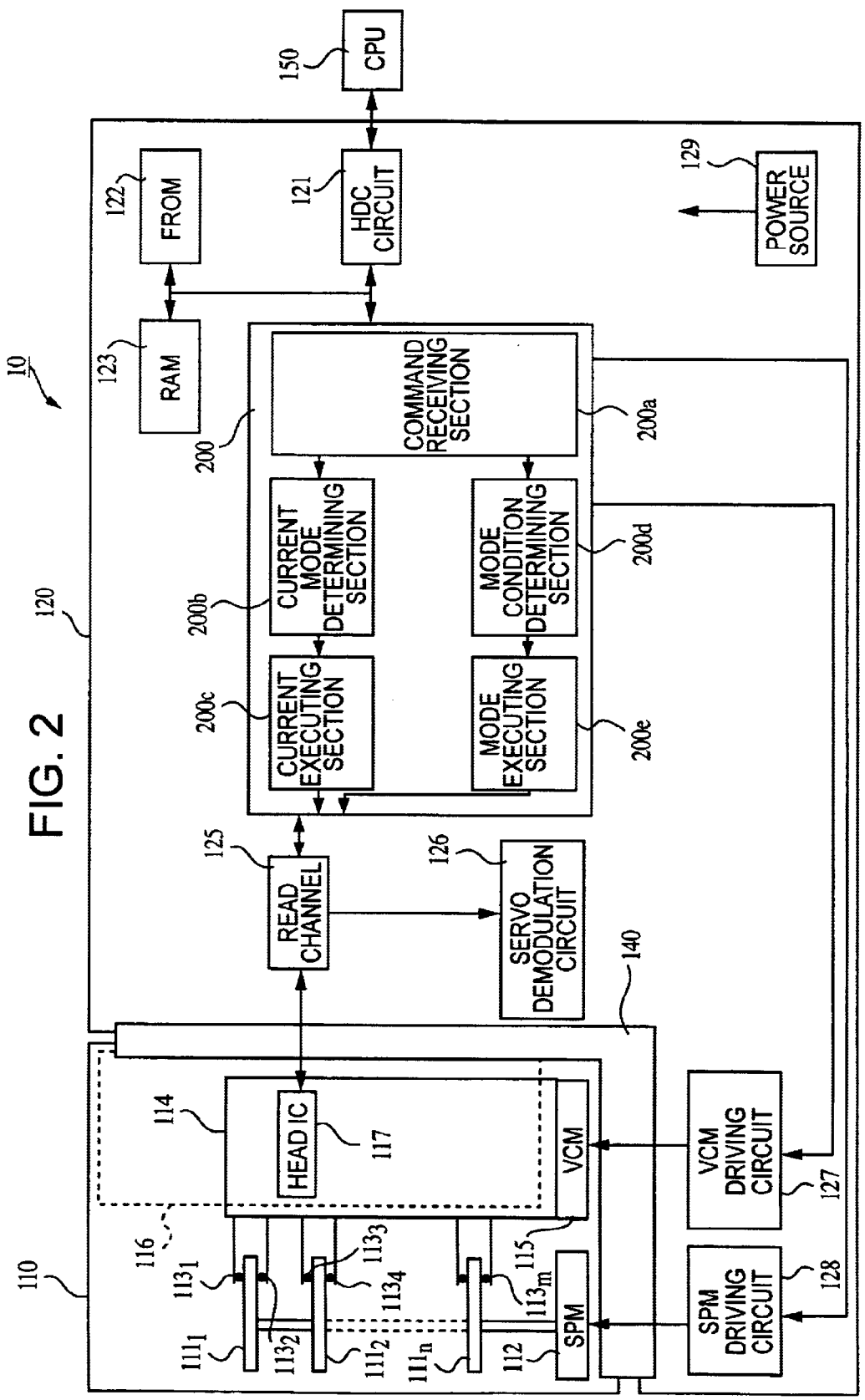
FIG. 2 is a block diagram showing the electrical configuration of the storage device 10 according to the preferred embodiment of the invention.
Figure 9:
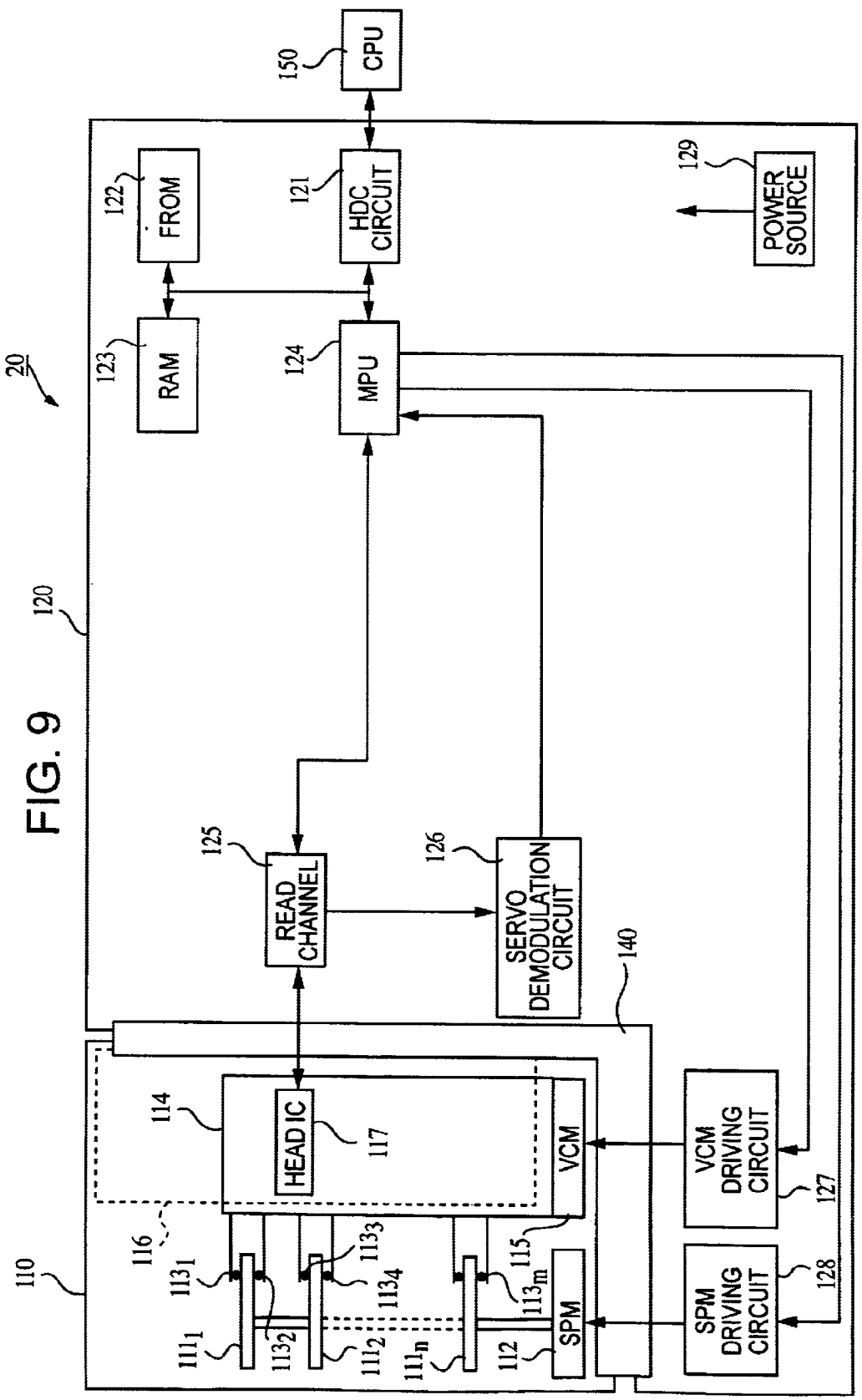
FIG. 9 is a block diagram showing the electrical configuration of a conventional storage device 20.

FIG. 1 is a exploded perspective view showing the outer configuration of a storage device 10 according to a preferred embodiment of the invention. FIG. 2 is a block diagram showing the electrical configuration of the storage device 10 according to the preferred embodiment. In FIGS. 1 and 2, the same reference numerals are attached to components corresponding to respective ones of FIG. 9 and a description thereof is omitted. In the storage device 10 shown in FIG. 2, an MPU 200 is provided instead of a MPU 124 shown in FIG. 9.

This MPU 200 executes controls on power save mode and migration mode and read/write control as the MPU 124 does (See FIG. 1). However, in various controls of the MPU 200, control at the time of switching from power save mode or migration mode to ordinary mode is different from the control which the MPU 124 executes. This will be described in detail with reference to a flowchart.

In the MPU 200, a command receiving section 200a receives various commands (read command, write command, power save mode transfer command and the like) from a CPU 150 (host system) through a HDC circuit 121. Here, the read command is a command for instructing to read data stored in magnetic disks $111_1$–$111_n$ through magnetic heads $113_1$–$113_m$ by controlling a read channel 125.

Write command is a command for instructing to write write data in a predetermined region of magnetic disks $111_1$–$111_n$ through the magnetic heads $113_1$–$113_m$ by controlling the read channel 125. The power save mode transfer command is a command for instructing to transfer power supply condition from a power source 129 for each part of the device from normal power supply condition to power supply saving condition.

A current mode determining section 200b determines whether the current mode is power save mode or migration mode when the read/write command is received by the command receiving section 200a. A command executing section 200c executes a command corresponding to a determination result of the current mode determining section 200b. Command to be executed by the command executing section 200c will be described later. A mode condition determining section 200d determines a condition for the power save mode and a condition for the migration mode.

Concretely, there are two conditions as the condition for the power save mode, a condition for transferring from ordinary mode to power save mode (input of power save mode transfer command) and a condition for transferring from the power save mode to ordinary mode (input of read/write command and seek command). On the other hand, there are two conditions as the condition for the migration mode, a condition for transferring from ordinary mode to migration mode (for example, no read/write command is input for more than 15 seconds) and a condition for switching from the migration mode to ordinary mode (input of read/write command or seek command).

A mode executing section 200e executes control about switching from ordinary mode to power save mode, switching from power save mode to ordinary mode, switching from ordinary mode to migration mode, and transfer from migration mode to ordinary mode according to a determination result of the mode condition determining section 200d.

Next, six operating examples of the storage device 10 according to the preferred embodiment will be described with reference to flowcharts shown in FIGS. 3 to 8. Read/write operation relating to the power save mode will be described with reference to FIG. 3 (first operating example), FIG. 4 (second operating example) and FIG. 5 (third operating example). Read/write operation relating to migration mode will be described with reference to FIG. 6 (forth operating example), FIG. 7 (fifth operating example) and FIG. 8 (sixth operating example).

1. First Operating Example

Figure 3:
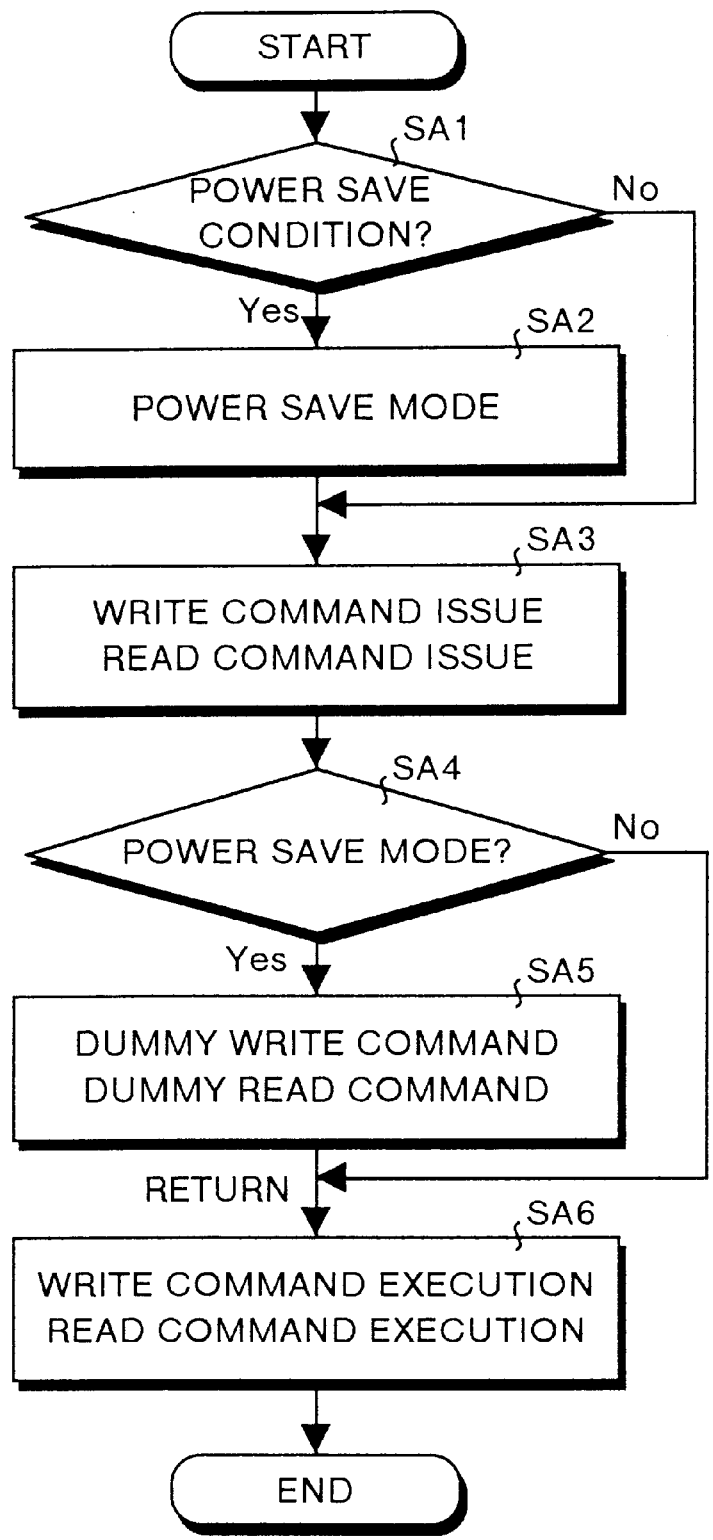
FIG. 3 is a flowchart which explains a first operating example of the storage device 10 according to the preferred embodiment of the invention.

The first operating example will be described with reference to the flowchart shown in FIG. 3. Referring to FIG. 2, when a predetermined time interval passes after electric power is supplied to respective parts of the device from the power source 129, the storage device 10 switches to ordinary mode. In the ordinary mode, normal power is supplied to respective parts of the device and the magnetic heads $113_1$–$113_m$ are on track so as to read all servo patterns of the magnetic disks $111_1$–$111_n$.

In such ordinary mode, in step SA1, the CPU 150 determines whether or not a condition for switching from ordinary mode to power save mode is satisfied. If this determination result is "NO", the processing proceeds to step SA3. Here, this condition includes that the storage device 10 has not been used for more than a predetermined time, or that a command is input from user and the like. In this case, assuming that the condition is satisfied, the CPU 150 adopts "YES" as the determination result of step SA1 and the processing proceeds to step SA2. Then, a power save mode switching command for switching from ordinary mode to power save mode is output to the command receiving section 200a of the MPU 200 through the HDC circuit 121.

Then, the mode condition determining section 200d determines that the condition for switching from ordinary mode to power save mode is satisfied according to the power save switching command and the mode executing section 200e stops a supply of power to a head IC 117 and read channel 125 (sleep condition). Thus, the power save mode is activated in which the power to be consumed in the entire of the storage device 10 is saved. In the power save mode, because the magnetic heads $113_1$–$113_m$ are not on track, the read/write operation cannot be carried out.

Then, in step SA3, the CPU 150 issues a read/write command to perform read/write to the magnetic disks $111_1$–$111_n$. This read/write command is received by the command receiving section 200a of the MPU 200 through the HDC circuit 121. As a result, in step SA4, the current mode determining section 200b of the MPU 200 determines whether or not the power save mode is activated. When the determination result is "NO", the command executing section 200c executes a processing of step SA6.

In this case, because the power save mode is activated, the current mode determining section 200b adopts "YES" as the determination result of step SA4. Consequently, in step SA5, the command executing section 200c executes a dummy write command or a dummy read command. Here, the dummy write command is a command for writing dummy data in a dummy region (cylinder) preliminarily set in the magnetic disks $111_1$–$111_n$. On the other hand, the dummy read command is a command for reading read data in a dummy region (cylinder) preliminarily set in the magnetic disks $111_1$–$111_n$. The dummy region (cylinder) mentioned here refers to a region other than normal read/write region and dummy data to be written in or read from this dummy region is meaningless data. The power save mode is then switched to ordinary mode, in which the command executing section 200c of the MPU 200 makes the magnetic heads $113_1$–$113_m$ track the magnetic disks $111_1$–$111_n$ according to information of the servo pattern supplied from a servo demodulation circuit 126 and executes the read/write operation to the aforementioned dummy region (dummy cylinder). Then, the processing proceeds to step SA6. Even if write fault error/read error is occurred because the magnetic disks $111_1$–$111_n$ are not on track completely when the read/write operation is executed, there is no serious problem, because this is error corresponding to the dummy region. After the dummy write/dummy read command is executed, the magnetic heads $113_1$–$113_m$ are on track completely according to the servo pattern.

In step SA6, the command executing section 200c executes normal write/read command issued by the CPU 150 so as to executes read/write operation to the magnetic disks $111_1$–$111_n$. As a result, when this normal write/read command is executed, the magnetic heads $113_1$–$113_m$ are on track completely as described above. Therefore, reading/writing is normally carried out without the occurrence of a fault error or a read error.

2. Second Operating Example

The second operating example will be described with reference to the flowchart shown in FIG. 4. Because in FIG. 4, processes of steps SB1 to SB4 and SB6 are the same as those of steps SA1 to SA4 and SA6 shown in FIG. 3 respectively, a detailed description thereof is omitted. That is, in the second operating example, the process of step SB5 shown in FIG. 4 is different from the process of step SA5 shown in FIG. 3.

Figure 4:
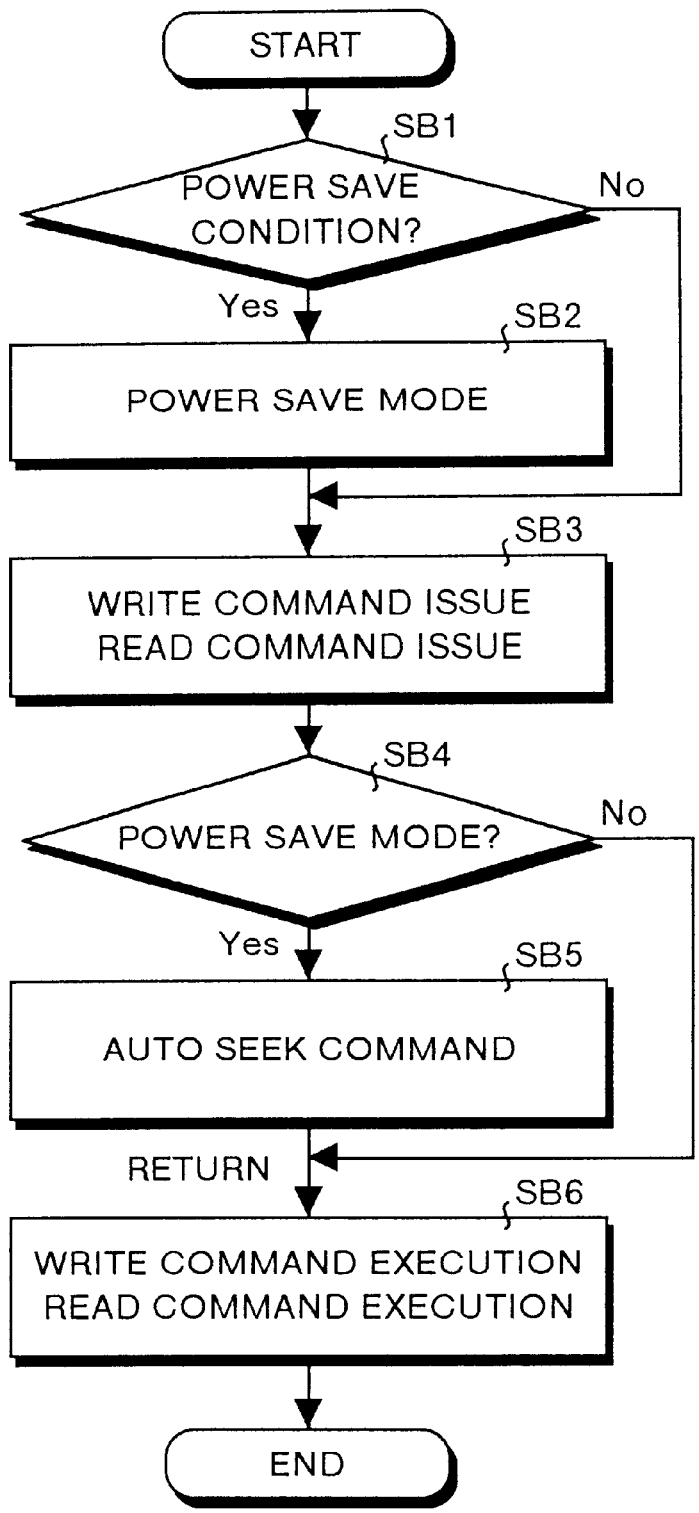
FIG. 4 is a flowchart which explains a second operating example of the storage device 10 according to the preferred embodiment of the invention.

That is, in the power save mode, when a write/read command is input to the command receiving section 200a of the MPU 200 shown in FIG. 2, in step SB4 shown in FIG. 4, the current mode determining section 200b adopts "YES" as the determination result. Consequently, in step SB5, the command executing section 200c executes an auto seek command. Here, the auto seek command is a command for attaining complete on-track condition by making the magnetic heads $113_1$–$113_m$ seek over the magnetic disks $111_1$–$111_n$.

Then, the power save mode is transferred to ordinary mode, in which the command executing section 200c of the MPU 200 controls a VCM driving circuit 127 to make the magnetic heads $113_1$–$113_m$ seek over the magnetic disks $111_1$–$111_n$ and then the processing proceeds to step SB6. During this seek operation, the command executing section 200c recognizes information on the servo pattern read by the magnetic heads $113_1$–$113_m$ from a demodulation result of the servo demodulation circuit 126. Then, the command executing section 200c controls each driving current of the VCM driving circuit 127 and SPM driving circuit 128 according to the result of the recognition so as to carry out positioning control for making the magnetic heads $113_1$–$113_m$ into the on-track condition.

In step SB6, the command executing section 200c carries out read/write operation on the magnetic disks $111_1$–$111_n$ by executing normal write/read command issued by the CPU 150. At the time when the normal write/read command is executed, the magnetic heads $113_1$–$113_m$ are completely in on-track condition by execution of the auto seek command. Therefore, reading/writing is normally carried out without the occurrence of a write fault error or a read error.

3. Third Operating Example

The third operating example will be described with reference to a flowchart shown in FIG. 5. Because in FIG. 5, processes of steps SC1 to SC4 and SC6 are the same as those of steps SA1 to SA4 and SA6 shown in FIG. 3 respectively, a detailed description thereof is omitted. That is, in the third operating example, a process of step SC5 shown in FIG. 5 is different from that of step SA5 shown in FIG. 3.

Figure 5:
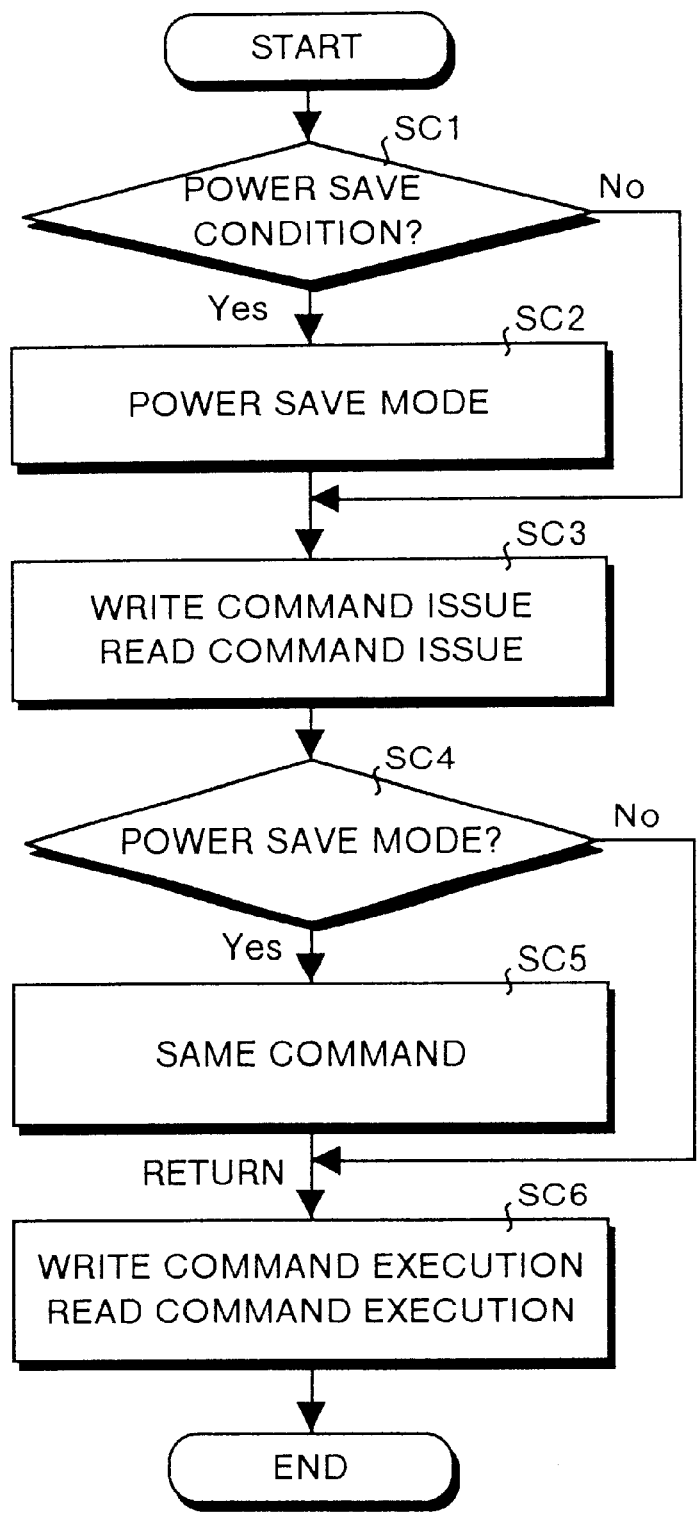
FIG. 5 is a flowchart which explains a third operating example of the storage device 10 according to the preferred embodiment of the invention.

That is, in the power save mode, when a write/read command is input to the command receiving section 200a of the MPU 200 shown in FIG. 2, in step SB4 shown in FIG. 5, the current mode determining section 200b adopts "YES" as the determination result. As a result, in step SC5, the power save mode is transferred to ordinary mode, in which the command executing section 200c of the MPU 200 executes the same command as the normal read/write command issued in step SC3.

That is, the command executing section 200c controls the VCM driving circuit 127 according to the normal read/write command. Consequently, the VCM 115 is driven, and a seek operation, in which the magnetic disks $111_1$–$111_n$ are moved to a predetermined position, is carried out. When they are moved to the predetermined position, the magnetic heads $113_1$–$113_m$ are in the on-track condition or in unstable on-track condition. In this case, assuming that they are in unstable on-track condition, as described above, a write fault error/read error occurs during read/write operation. However, the command executing section 200c neglects the write fault error/read error. After the execution of the read/write command is executed, the magnetic heads $113_1$–$113_m$ are completely in on-track condition according to information of the servo pattern.

In step SC6, the command executing section 200c executes read/write operation to the magnetic disks $111_1$–$111_n$ by executing normal write/read command issued by the CPU 150. At the time when the normal write/read command is executed, the magnetic heads $113_1$–$113_m$ are completely in on-track condition because the first normal write/read command is executed as described above. Therefore, reading/writing is normally carried out without the occurrence of a write fault error or a read error.

4. Forth Operating Example

Figure 6:
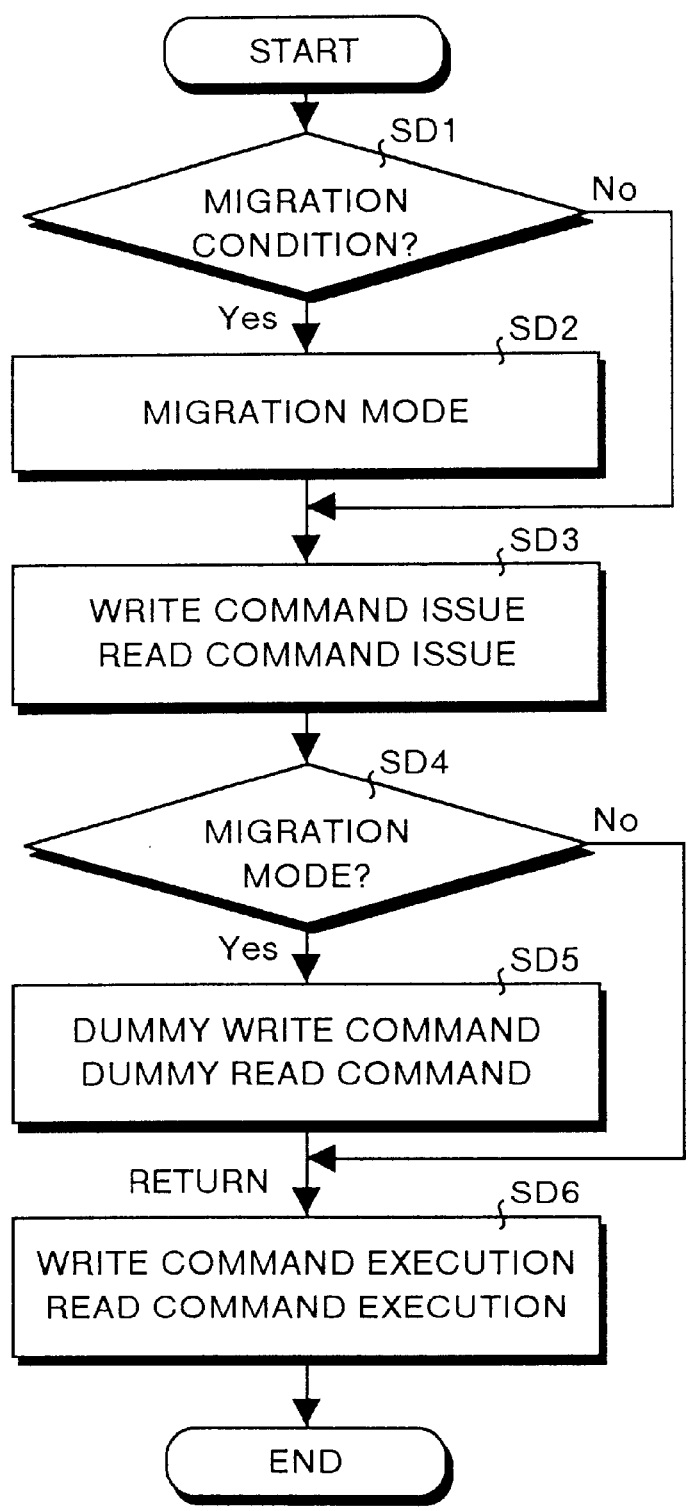
FIG. 6 is a flowchart which explains a fourth operating example of the storage device 10 according to the preferred embodiment of the invention.

The forth operating example (migration mode) will be described with reference to the flowchart shown in FIG. 6. Assuming that normal mode is selected in FIG. 2, in step SD1, the mode condition determining section 200d determines whether or not the condition for switching from normal mode to migration mode is satisfied. When the result of this determination is "NO", the processing proceeds to step SD3. This condition is the condition, for example, to pass 15 seconds or more until the following read/write command is received after a read/write command being received by the command receiving section 200a.

In this case, when the condition is satisfied, the mode condition determining section 200d adopts "YES" as the determination result of step SD1. As a result, in step SD2, the mode executing section 200e controls the magnetic heads $113_1$–$113_m$ of on-track condition to read, for example, one (or two or more) servo patterns at a time by controlling a read channel 125 and ahead IC 117, so that it switches to the migration mode. However, because in the migration mode, a quantity of information (one or two pieces of information read at a time) of the servo pattern read by the magnetic heads $113_1$–$113_m$ is smaller as compared to the ordinary mode, the locations of the magnetic heads $113_1$–$113_m$ are unstable although they are barely in the on-track condition.

Then, in step SD3, if the CPU 150 issues a read/write command, this read/write command is received by the command receiving section 200a of the MPU 200 through the HDC circuit 121. Then, in step SD4, the current mode determining section 200b of the MPU 200 determines whether or not the migration mode is activated. When this determination result is "NO", the command executing section 200c executes processing of step SD6.

In this case, because the migration mode is ON, the current mode determining section 200b adopts "YES" as the determination result of step SD4. As a result, in step SD5, the command executing section 200c executes a dummy write command or dummy read command like in the step SA4 (see FIG. 3).

Then, the migration mode is switched to ordinary mode and the command executing section 200c of the MPU 200 makes the magnetic heads $113_1$–$113_m$ track the magnetic disks $111_1$–$111_n$ according to information of the servo pattern supplied by the servo demodulation circuit 126 so as to carry out read/write to the dummy region (dummy cylinder). Then, the processing proceeds to step SD6. Even if a write fault error/read error has occurred when the read/write operation is carried out, there is no serious problem, because it is an error corresponding to the dummy region. After the dummy write/dummy read command is executed, the magnetic heads $113_1$–$113_m$ are completely in the on-track condition according to the servo pattern.

In step SD6, the command executing section 200c executes a normal write/read command issued by the CPU 150 so as to carry out read/write operation to the magnetic disks $111_1$–$111_n$. When the aforementioned normal write/read command is executed, the magnetic heads $113_1$–$113_m$ are completely in the on-track condition as described above. Therefore, reading/writing is normally carried out without the occurrence of a write fault error or a read error.

5. Fifth Operating Example

Figure 7:
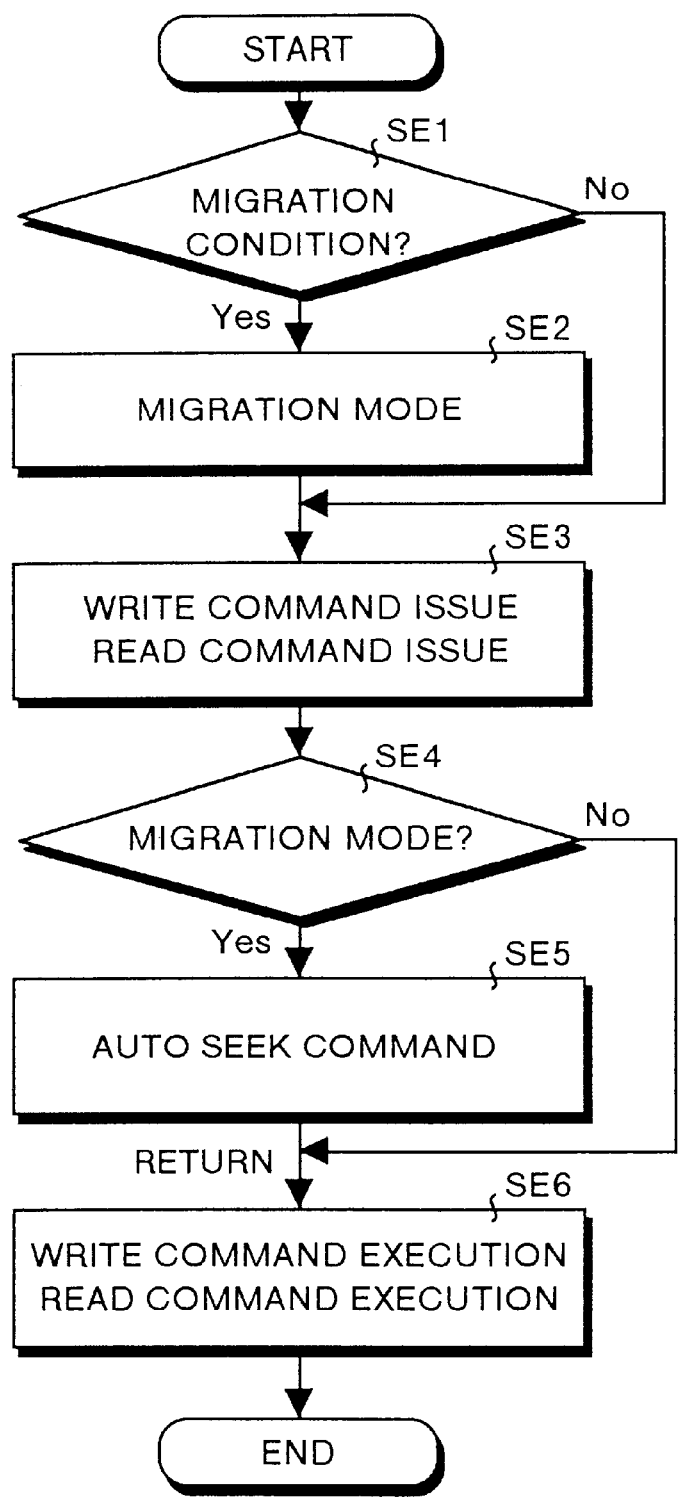
FIG. 7 is a flowchart which explains a fifth operating example of the storage device 10 according to the preferred embodiment of the invention.

The fifth operating example will be described with reference to the flowchart shown in FIG. 7. In FIG. 7, because processes of steps SE1 to SE4 and SE6 are the same as those of steps SA1 to SA4 and SA6 shown in FIG. 3, a detailed description thereof is omitted. Further, in the fifth operating example, a process of step SE5 shown in FIG. 7 is the same as that of step SB5 shown in FIG. 4.

That is, when a write/read command is input to the command receiving section 200a of the MPU 200 shown in FIG. 2 under migration mode, in step SE4 shown in FIG. 7, the current mode determining section 200b adopts "YES" as the determination result. Therefore, in step SE5, the command executing section 200c executes auto seek command like in the aforementioned step SB5 (see FIG. 4).

Then, the migration mode is switched to ordinary mode and the command executing section 200c of the MPU 200 controls the VCM driving circuit 127 so as to make the magnetic heads $113_1$–$113_m$ seek over the magnetic disks $111_1$–$111_n$. Then, the processing proceeds to step SE6. During this seek operation, the command executing section 200c controls positioning to make the magnetic heads $113_1$–$113_m$ in the on-track condition according to information of the servo pattern.

In step SE6, the command executing section 200c executes normal write/read command issued by the CPU 150 so as to execute read/write operation to the magnetic disks $111_1$–$111_n$. At the time when the normal write/read command is executed, the magnetic heads $113_1$–$113_m$ are completely in on-track condition because the auto seek command is executed as described above. Therefore, reading/writing is normally carried out without the occurrence of a write fault error or a read error.

6. Sixth Operating Example

Figure 8:
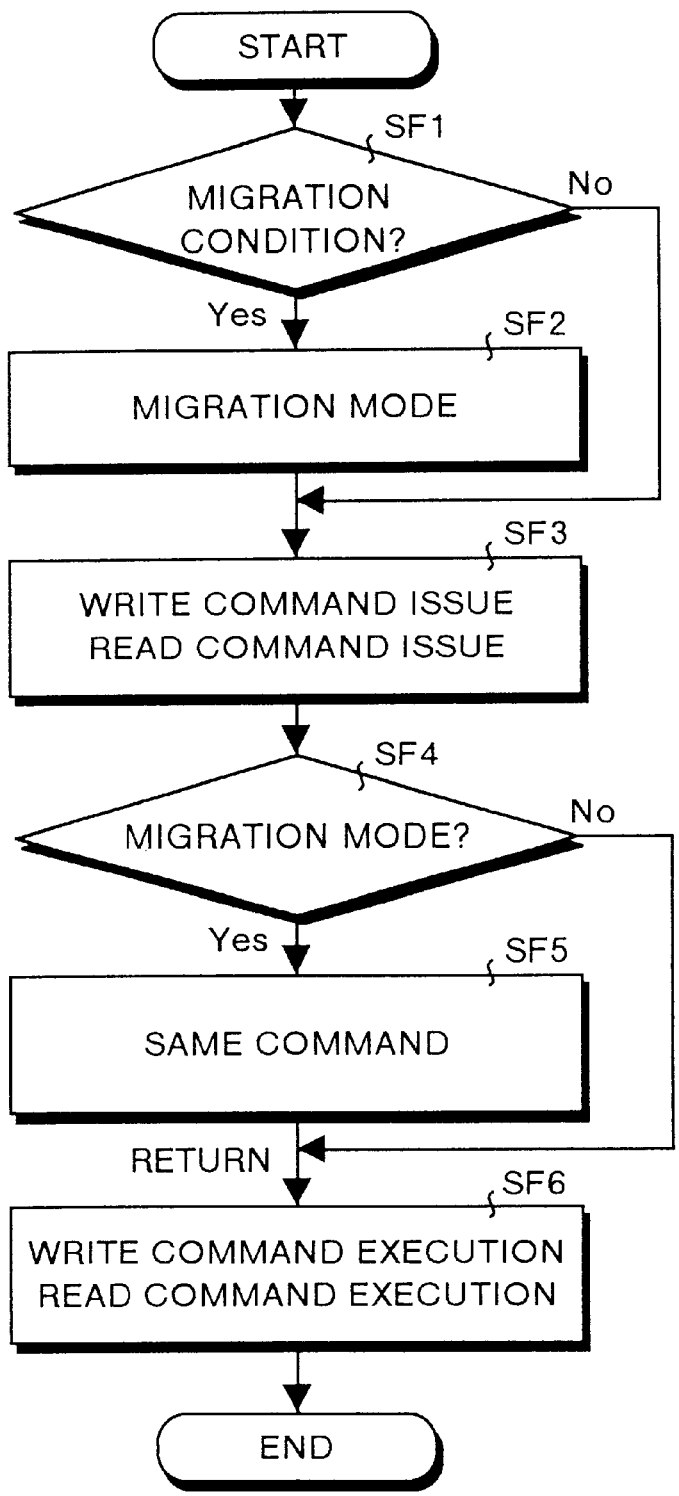
FIG. 8 is a flowchart which explains a sixth operating example of the storage device 10 according to the preferred embodiment of the invention.

The sixth operating example will be described with reference to a flowchart shown in FIG. 8. In FIG. 8, because processes of steps SF1 to SF4 and SF6 are the same as those of steps SA1 to SA4 and SA6 shown in FIG. 2, a detailed description thereof is omitted. That is, in the sixth operating example, a process of step SF5 shown in FIG. 8 is the same as that of step SC5 shown in FIG. 5.

That is, when a write/read command is input to the command receiving section 200a of the MPU 200 shown in FIG. 2 under migration mode, in step SF4 shown in FIG. 8, the current mode determining section 200b adopts "YES" as the determination result. Consequently, in step SF5, the migration mode is switched to ordinary mode. The command executing section 200c of the MPU 200 executes the same command as normal read/write command issued in step SF3 like the SC5 (see FIG. 5). After this read/write command is executed, as described above, the magnetic heads $113_1$–$113_m$ are completely in the on-track condition based on information of the servo pattern.

In step SE6, the command executing section 200c executes normal write/read command issued by the CPU 150 so as to execute read/write operation to the magnetic disks $111_1$–$111_n$. At the time when the normal write/read command is executed, the magnetic heads $113_1$–$113_m$ are completely in on-track condition. Therefore, reading/writing is normally carried out without the occurrence of a write fault error or a read error.

In the storage device 10 according to the preferred embodiment, as described above in the six operating examples, by carrying out dummy write/read command, auto seek command, or normal read/write command (first time) at the time of switching from the power save mode to ordinary mode and at the time of switching from the migration mode to ordinary mode. Then, after the magnetic heads $113_1$–$113_m$ are completely made into the on-track condition, normal read/write command is executed. Therefore, an occurrence of write fault error/read error can be avoided.

The storage device 10 according to the preferred embodiment of the present invention has been described with reference to the drawings. However, the configuration of the present invention is not restricted to this embodiment, but modifications and changes are included in the present invention unless they depart from the sprit thereof. For example, although the storage device 10 according to the preferred embodiment of the invention has been described about an example in which the magnetic disk is used as a recording medium, the kind of the recording medium is not a matter to be considered. Therefore, the present invention is applicable for an optical disk device employing an optical disk as a recording medium.

As described above, according to the first aspect of the invention, because normal read/write operation is carried out after the head is placed completely in the on-track condition by executing read/write of dummy data to a dummy region on a recording medium when a read/write command is received under the power save mode, an occurrence of write fault error/read error can be avoided.

According to the second aspect of the invention, because the read/write operation is carried out after the head is placed completely in the on-track condition by carrying out seek operation for making the head seek to a predetermined position on a recording medium when a read/write command is received under the power save mode, an occurrence of write fault error/read error can be avoided.

According to the third aspect of the invention, because a second read/write operation is carried out after the head is placed completely in the on-track condition by carrying out a first read/write operation when a read/write command is received under the power save mode, an occurrence of write fault error/read error can be avoided.

According to the fourth aspect of the invention, because read/write operation is carried out after the head is placed completely in the on-track condition by carrying out read/write of dummy data to a dummy region on a recording medium when a read/write command is received under the migration mode, an occurrence of write fault error/read error can be avoided.

According to the fifth aspect of the invention, because the read/write operation is carried out after the head is placed completely in the on-track condition, by carrying out seek operation for making the head seek to a predetermined position on a recording medium when a read/write command is received under the migration mode, an occurrence of write fault error/read error can be avoided.

According to the sixth aspect of the invention, because a second read/write operation is carried out after the head is placed completely in the on-track condition by carrying out a first read/write operation when a read/write command is received under the migration mode, an occurrence of write fault error/read error can be avoided.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage device having a mode for saving the electric power supplied to each part of the device, said storage device comprising:
   a head which reads or writes data from or on a recording medium; and
   a read/write control unit which controls said head based on a read/write command for reading data from or writing data on said recording medium such that said head performs two read/write operations corresponding to the read/write command, when said read/write control unit receives the read/write command from a host during the power saving mode.

2. The storage device according to claim 1, wherein when said read/write control unit receives the read/write command, said read/write control unit first executes a dummy read/write as one of the two read/write operations with respect to a dummy area preset on said recording medium and then executes a normal read/write as another one of the two read/write operations with respect to said recording medium.

3. The storage device according to claim 1, wherein the mode is a power save mode in which electric power supplied to each part of the device is saved.

4. The storage device according to claim 3, wherein in the power save mode, at least the electric power supplied to said head is stopped.

5. The storage device according to claim 1, wherein the mode is a migration mode in which, when certain conditions are fulfilled, the servo patterns on said recording medium are read at least alternately.

6. A storage device having a mode for saving the electric power supplied to each part of the device, said storage device comprising:
   a head which reads or writes data from or on a recording medium;
   a seek unit which seeks said head to a predetermined position on said recording medium when a read/write command for reading data from or writing data on said recording medium is received from a host during the power saving mode, said head being moved to said predetermined position before said read/write command is executed; and a read/write control unit which controls said head based on the read/write command received such that said head performs a read/write operation, after the seek operation to said predetermined position has been completed.

7. The storage device according to claim 6, wherein the mode is a power save mode in which electric power supplied to each part of the device is saved.

8. The storage device according to claim 7, wherein in the power save mode, at least the electric power supplied to said head.

9. The storage device according to claim 6, wherein the mode is a migration mode in which, when certain conditions are fulfilled, the servo patterns on said recording medium are read at least alternately.

10. A method for controlling a storage device, which storage device having a mode for saving the electric power sup plied to each part of the device, said method comprising:

a read/write step of controlling a head based on a read/write command for reading data from or writing data on a recording medium such that said head performs two read/write operations to the read/write command, when the read/write command is received from a host during the power saving mode.

11. The method for controlling a storage device according to claim 10, wherein in the read/write step, when the read/write command is received, a dummy read/write with respect to a dummy area preset on said recording medium is first executed as one of the two read/write operations and then a normal read/write with respect to said recording medium is executed as another one of the two read/write operations.

12. The method for controlling a storage device according to claim 10, wherein the mode is a power save mode in which electric power supplied to each part of the storage device is saved.

13. The method for controlling a storage device according to claim 12, wherein in the power save mode, at least the electric power supplied to said head is stopped.

14. The method for controlling a storage device according to claim 10, wherein the mode is a migration mode in which, when certain conditions are fulfilled, the servo patterns on said recording medium are read at least alternately.

* * * * *

UNITED STATES PATENT AND TRADEMARK OFFICE
CERTIFICATE OF CORRECTION

PATENT NO.   : 6,624,962 B1
DATED        : September 23, 2003
INVENTOR(S)  : Kodama et al.

It is certified that error appears in the above-identified patent and that said Letters Patent is hereby corrected as shown below:

Column 13,
Line 16, after "head", insert -- is stopped --.

Signed and Sealed this

Twentieth Day of January, 2004

JON W. DUDAS
*Acting Director of the United States Patent and Trademark Office*